United States Patent [19]

Heller et al.

[11] Patent Number: 5,682,821

[45] Date of Patent: Nov. 4, 1997

[54] DISPLACEMENT DEVICE FOR THE HORIZONTAL DISPLACEMENT OF HEAVY LOADS

[75] Inventors: Heinz Heller, Erlanger; Wolf Kuhlmann, Nürnberg; Dieter Hesse, Erlangen, all of Germany

[73] Assignee: Lukas Hydraulik GmbH, Erlangen, Germany

[21] Appl. No.: 584,800

[22] Filed: Jan. 11, 1996

[30] Foreign Application Priority Data

Jan. 26, 1995 [DE] Germany .......... 195 02 292.0

[51] Int. Cl.$^6$ ............................. B61K 5/00
[52] U.S. Cl. ................... 104/262; 104/273; 254/45
[58] Field of Search ............ 104/262, 272, 104/273, 263; 254/33, 45, 93 VA, 423

[56] References Cited

U.S. PATENT DOCUMENTS

| | | | |
|---|---|---|---|
| 2,980,035 | 4/1961 | Cole et al. | 104/273 |
| 3,362,351 | 1/1968 | Robertson et al. | 104/273 |
| 4,090,453 | 5/1978 | Ali et al. | 104/273 |
| 4,809,615 | 3/1989 | Brickett | 104/273 |

FOREIGN PATENT DOCUMENTS

| | | | |
|---|---|---|---|
| 766517 | 9/1967 | Canada | 104/273 |
| 2070773 | 9/1971 | France | |
| 1071120 | 12/1959 | Germany | |
| 2233756 | 1/1974 | Germany | |

Primary Examiner—S. Joseph Morano
Attorney, Agent, or Firm—Merchant, Gould, Smith, Edell, Welter & Schmidt, P.A.

[57] ABSTRACT

The invention relates to a displacement device for the horizontal displacement of heavy loads, especially of derailed rail vehicles or the like, having a lifting cylinder and a preferably hydraulically driven displacement mechanism, which allows the position of the load raised by the lifting cylinder to be varied, the lifting cylinder (2) being borne by a slide (6) which is horizontally movable, preferably in two opposite directions, the slide being disposed displaceably on the surface of a support and the piston rod (11) of a displacement cylinder arrangement being fixedly connected to the support without the one end of the piston rod (11) being latch-locked to the support in a displacement-dependent manner.

16 Claims, 5 Drawing Sheets

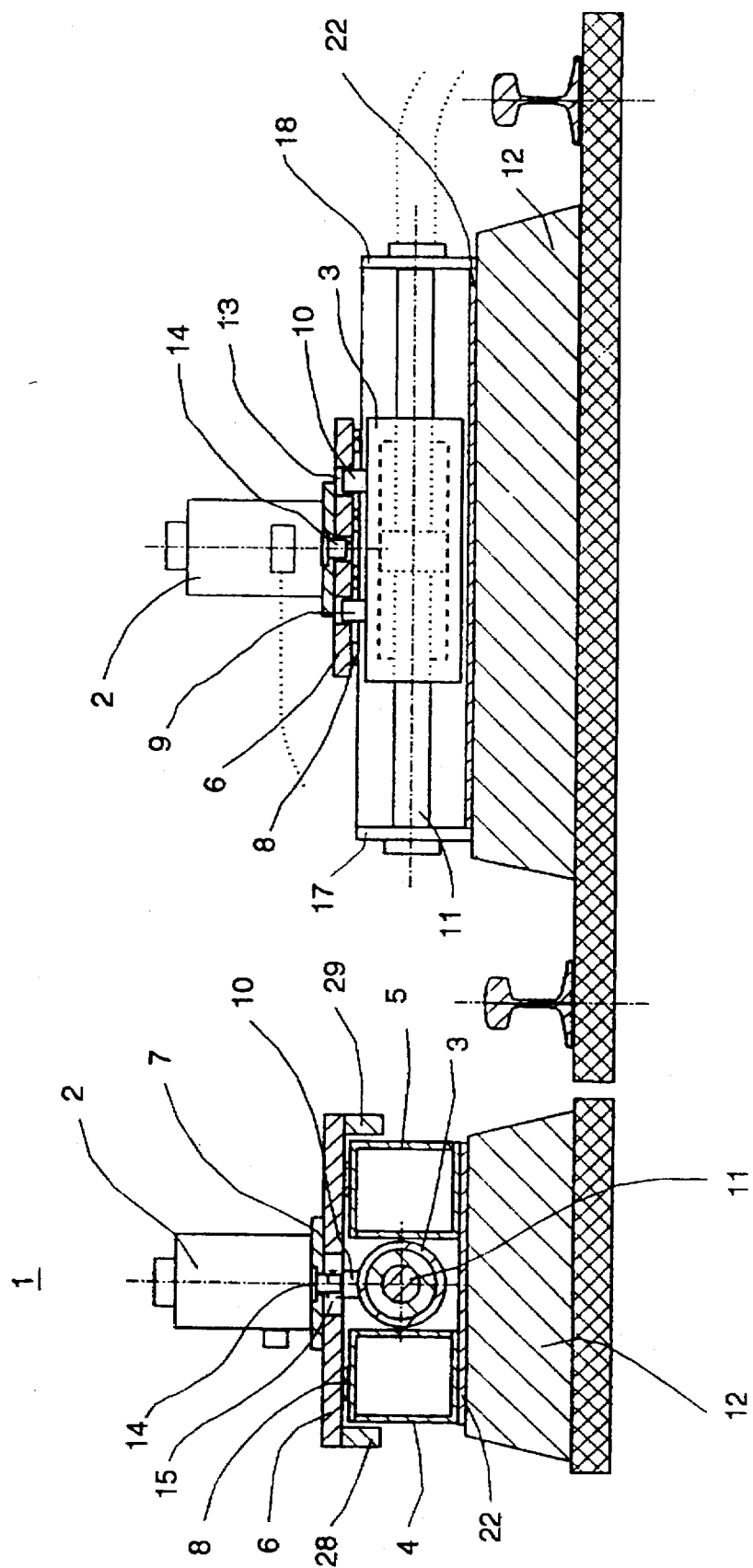

DISPLACEMENT DEVICE FOR THE HORIZONTAL DISPLACEMENT OF HEAVY LOADS

FIELD OF THE INVENTION

The present invention relates to a displacement device for the horizontal displacement of heavy loads.

BACKGROUND OF THE INVENTION

The main field of application of such displacement devices is that of rerailing technology, in which derailed locomotives, carriages, etc. can be lifted back onto the track using displacement devices of this type.

SUMMARY OF THE INVENTION

Traditional displacement devices of rerailing technology are characterized in that the lifting cylinder is able to be displaced only in one direction by means of a displacement cylinder, the piston rod of which displacement cylinder being supported on a support by means of a claw engaging on the top side of the said support. If the piston rod is fully extended, an operator has to remove the claw engaging on the support, displace the piston rod and re-insert it at the next recess along in the direction of displacement. Furthermore, in case of the Deutsche Bundesbahn, for example, only breakdown trains are equipped with such rerailing equipment, which has to be expressly requested in case of need, i.e. in the event of a derailment. In such cases, moreover, cable winches or mechanical jacks have been used, which might however in some circumstances result in damage to the running wheels and to mountings of the locomotive or carriage.

The object of the present invention consists in providing a displacement unit which can be used specifically in the event of "minor" derailments, i.e. derailments close to the track, in the form, so to speak, of a compact appliance, without a breakdown train needing to be requested from the railway company.

This object is achieved, with the displacement device of the invention.

The invention allows a compact appliance to be used, which enables the load to be displaced without an operator having to make his way beneath the load so as to alter the supporting of the piston rod relative to the support in terms of its position. The displacement device here can be designed such that it can be operated either in one direction only or preferably, indeed, in two opposite directions.

For the securement of the displacement position of the load, a locking valve is expediently provided.

The displacement cylinder arrangement can be realized in the form of a synchronous cylinder or, where appropriate, a telescopic synchronous cylinder. The latter has the advantage that the displacement length can be additionally enlarged relative to the overall length of the device. Both ensure a movement of the cylinder in both directions.

The use of a friction plate, which is displaceable relative to the slide, enables non-linear displacement of the load, for example along a circular arc, thereby enabling distortions and resultant perils or instabilities of the load to be effectively precluded.

Expediently, the friction plate and slide are placed one on the other, simply using a corresponding projection and a correspondingly dimensioned recess.

A possible variation of the displacement path of the displacement device according to the invention can additionally be afforded by the fact that on the top side of the slide there is provided a multiplicity of recesses into which the friction plate can optionally be inserted.

The support expediently comprises two square tubes, which are spaced apart and are interconnected by a fastening plate or fastening part and between which there is located the displacement cylinder arrangement or the synchronous cylinder.

The support can advantageously be configured as a one-piece casting, especially an aluminium casting. The fastening of the displacement cylinder arrangement is effected by means of a respective end plate provided on each side.

For the compensation of height tolerances, different spacers can be insertable on the top side of the friction plate, expediently at a corresponding recess for this purpose.

The slide-material discs work, on the one hand, by lowering the slide resistance between the slide and the support, whilst simultaneously, on the other hand, constantly cleaning the surface of the support.

In one embodiment, a fixed substructure or a separate base is provided, which has the advantage that the structural height can be chosen independently of the top edge of the rail arrangement, which, in traditional rerailing devices, forms the support for corresponding cross-beams.

The supply of hydraulic oil to the displacement cylinder is expediently effected by means of the piston rod. The displacement cylinder and lifting cylinder are respectively acted on by a dedicated pump, which is driven either manually or else by motor power, thereby increasing the reliability of the system.

In one embodiment of the present invention, a non-driven displacement unit is coupled to the slide of the displacement device by a linkage pivotably attached to the non-driven displacement unit and the slide, respectively. The displacement device according to the invention is particularly well suited to this by virtue of its design.

BRIEF DESCRIPTION OF THE DRAWINGS

A plurality of embodiments of the displacement device according to the invention are explained in greater detail below with reference to the drawings, in which:

FIG. 1 shows an expedient embodiment of the displacement device according to the invention in part-section representation;

FIG. 2 shows the displacement device according to FIG. 1 in side view, likewise in part-section;

DETAILED DESCRIPTION OF THE PREFERRED EMBODIMENT

Figure 3:
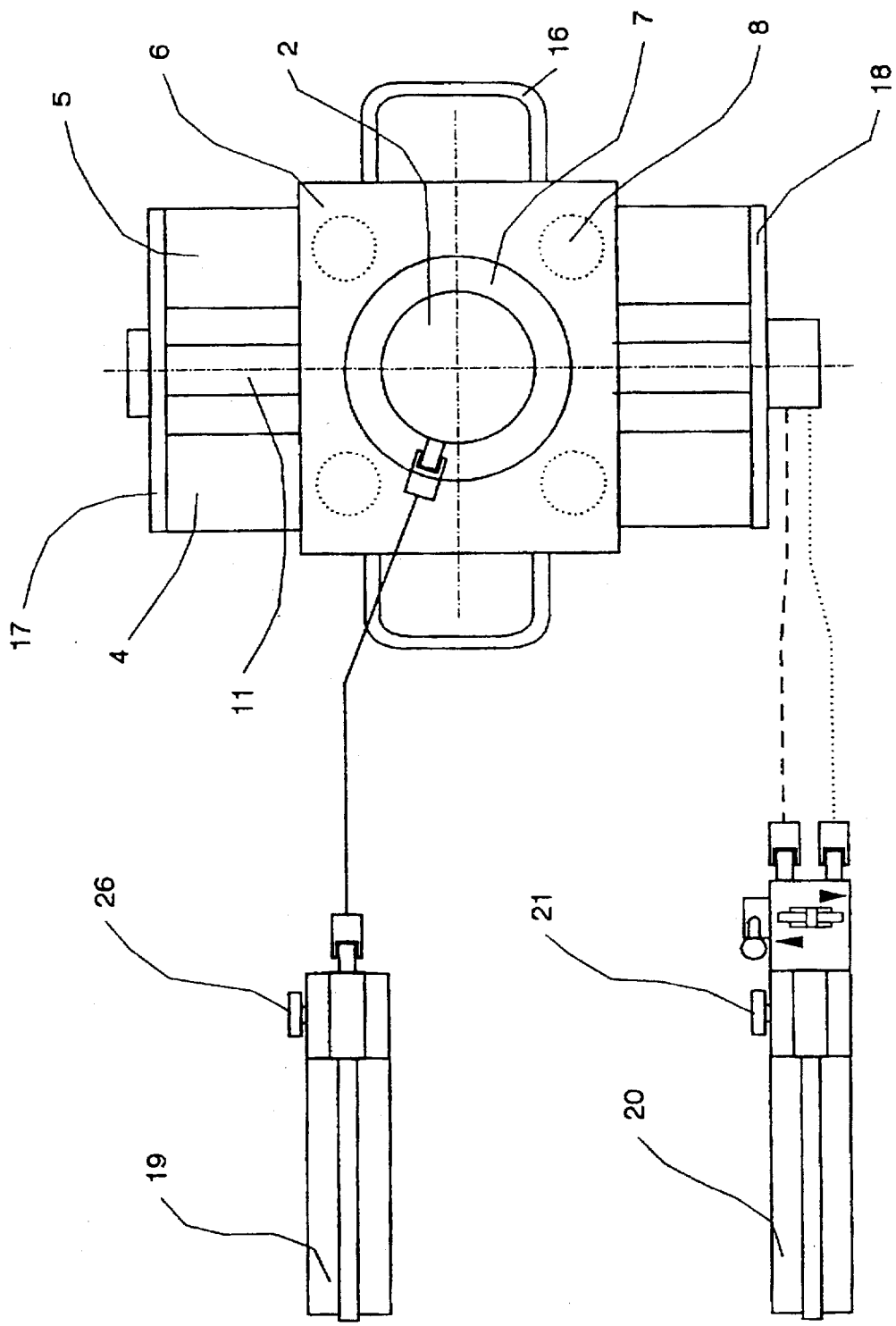
FIG. 3 shows the displacement device according to FIGS. 1 and 2 in top view, depicting the pumps provided for operating purposes.
Figure 4:
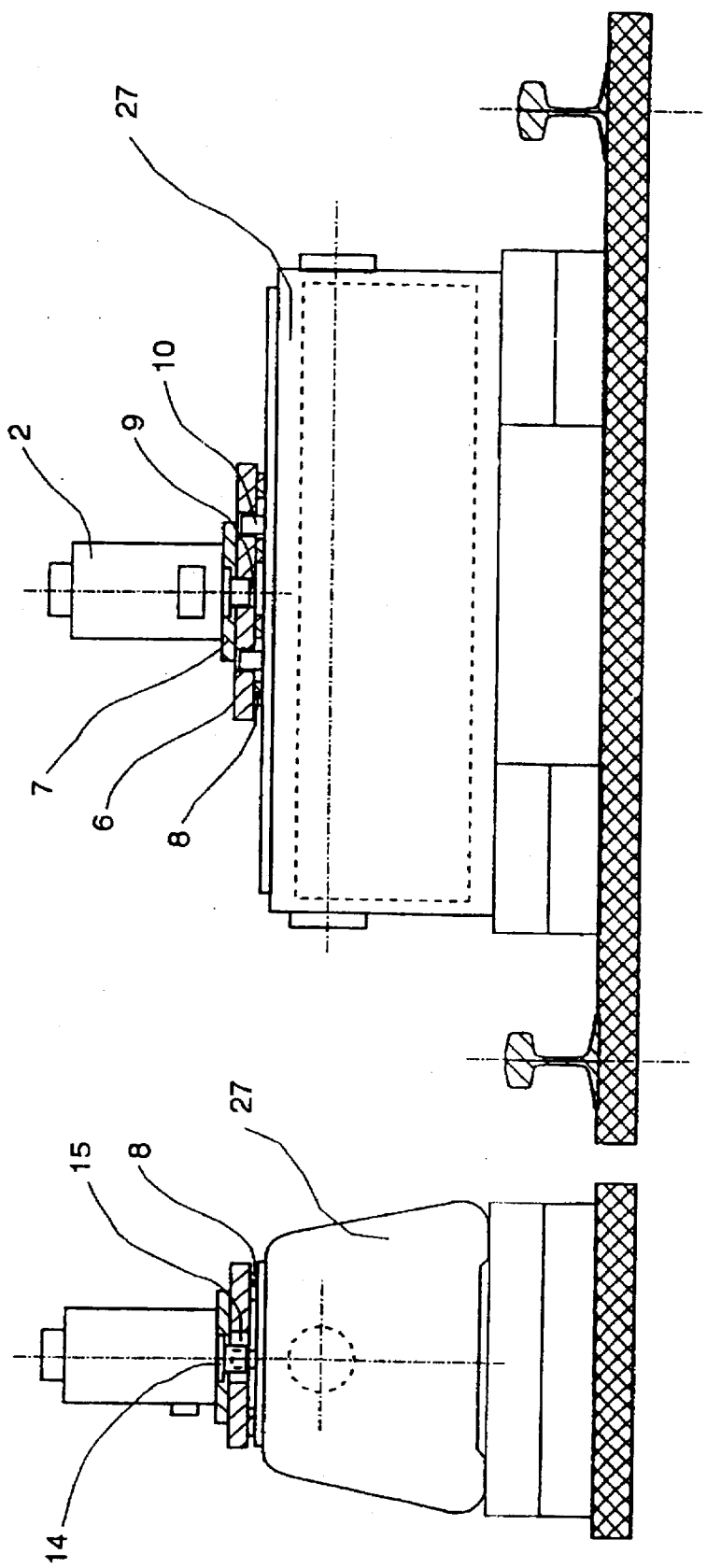
FIG. 4 shows a further embodiment of the displacement device according to the invention, using a support in the form of a casting, both in side view and in front-side representation of the casting inclusive of the slide.

The reference symbol 1 in FIG. 1 identifies the displacement device in its entirety. It comprises a conventional lifting cylinder 2, which is disposed on the top side of a slide 6 having downwardly running lateral edges 28, 29, which slide is movable along a support. Between the lifting cylinder 2 and the slide 6 there is a friction plate 7.

The support is formed by two square tubes 4, 5, which are disposed at a distance apart on a fastening plate 22 and on whose top sides there are provided slide-material discs 8 for increasing the sliding cability of the slide 6. On the bottom side of the displacement device 1 according to this embodiment there is provided a separate base 12, for example in the form of a metal or wooden block.

Between the two square tubes 4, 5 there is a so-called "synchronous cylinder" 3, preferably a telescopic synchronous cylinder, which moves the slide 6 in the horizontal plane by means of projections 9 and 10, which are disposed axially one behind the other, are provided on the top side and engage in a recess 13 on the said slide 6.

As can be seen from FIG. 2, the respective end of the piston rod 11 is fastened to a transverse-running end plate 17 or 18, which respectively forms, at the same time, the extremity of the two square tubes 4, 5.

The friction plate 7 has a holding projection 14, which engages in a corresponding recess 15 on the slide 6. The dimensioning of the recess 15 is chosen such that displaceability of the friction plate 7 relative to the slide 6 is ensured. By virtue of this design, the friction plate 7 can only be inserted with its holding projection 14 into the recess 15 on the top side of the slide 6.

On the top side of the slide 6, additional recesses (not represented in the figures) can be provided in specific arrangement in order to increase further the displacement variability.

As can be seen from FIG. 2, the synchronous cylinder 3 is connected to the slide 6 by a total of two projections 9 and 10.

According to FIG. 3, the synchronous cylinder 3 and lifting cylinder 2 is respectively operated by means of separate, i.e. mutually independent pumps 19 and 20.

Each of the pumps 19, 20 is equipped with a fixing valve 26 and 21 in order to ensure a secure fixing of the load in the respective displacement and lifting states. The two pumps 19, 20 can be constructed either as hand pumps or as motor-driven pumps.

It also becomes clear from FIG. 3 that the supply of hydraulic oil to the synchronous cylinder 3 is effected axially by means of the piston rod 11. The displacement device i is provided with two laterally disposed handles 16, whereby the displacement device 1, in the capacity, as it were, of a mobile displacement device 1, can be very easily transported and handled.

In a modification of the embodiment according to FIGS. 1-3, FIG. 4 shows a displacement device 1 having a support in the form of a casting 27, which is positioned on two chocks disposed in the end region.

Figure 5:
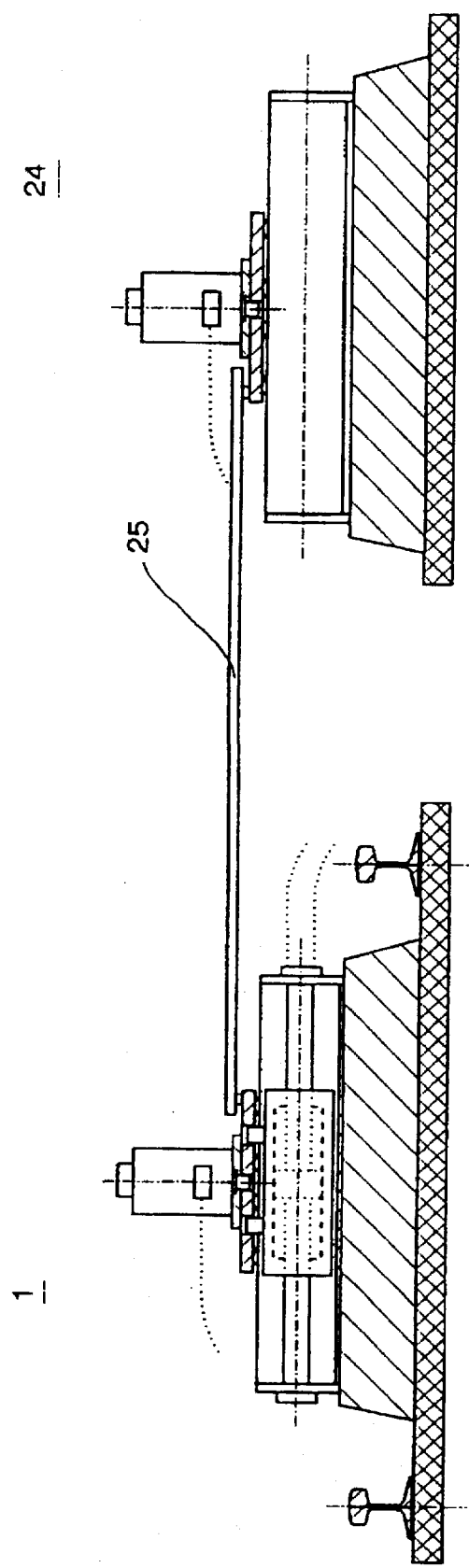
FIG. 5 shows a side-view representation of two displacement units, which are coupled together by a linkage, for ensuring two-point lifting.

FIG. 5 shows an arrangement having two displacement devices, connected by a linkage 25, for ensuring two-point lifting. It is here sufficient if only one displacement device 1 is driven in opposition to the displacement device 24.

Figure 6:
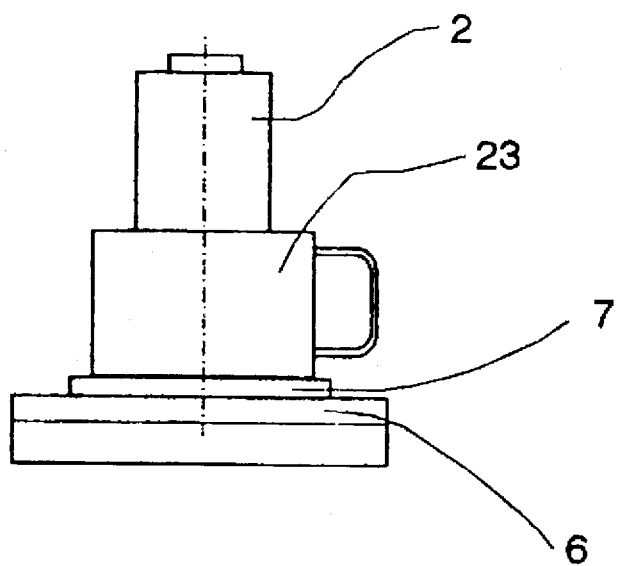
FIG. 6 shows a heavily simplified, diagrammatic representation of the use of a spacer.

For the adjustment of the desired height of the lifting cylinder 2, according to FIG. 6 a spacer 23 of the necessary size can be inserted between the friction plate 7 and the lifting cylinder 2. To this end, on the top side of the friction plate 7 there can expediently be provided a cavity for the insertion of the spacers in question.

The invention permits the use of an easily transportable and easy-to-handle displacement device, in which there is no need for the displacement device to be reset by operating staff during the displacement operation. It therefore represents a particular benefit in the relevant field of technology.

REFERENCE SYMBOLS

1 Displacement device
2 Lifting cylinder
3 Synchronous cylinder
4 Square tube
5 Square tube
6 Slide
7 Friction plate
8 Slide-material disc
9 Projection
10 Projection
11 Piston rod
12 Base
13 Recess
14 Holding projection
15 Recess
16 Handle
17 End plate
18 End plate
19 Pump
20 Pump
21 Fixing valve
22 Fastening plate
23 Spacer
24 Further displacement unit
25 Linkage
26 Fixing valve
27 Casting
28 Edge
29 Edge

We claim:

1. Displacement device for a horizontal displacement of derailed rail vehicles, comprising:
   a lifting cylinder;
   a hydraulically driven displacement cylinder arrangement including a piston rod, which allows a position of a load raised by means of the lifting cylinder to be altered, the lifting cylinder being borne by a slide, the slide being horizontally movable in two opposite directions and being disposed displaceably on a surface of a support, the piston rod of the displacement cylinder arrangement being rigidly connected to the support, the displacement cylinder arrangement being movable along the piston rod, and the displacement cylinder arrangement being in engagement with the slide.

2. Displacement device according to claim 1, further comprising a fixing valve for securing a respective position of the displacement cylinder arrangement.

3. Displacement device according to claim 1, further comprising a synchronous cylinder which moves the slide in a horizontal plane.

4. Displacement device according to claim 3, wherein the synchronous cylinder is a telescopic synchronous cylinder.

5. Displacement device according to claim 4, further comprising a friction plate between the lifting cylinder and the slide such that the friction plate is displaceable relative to the slide.

6. Displacement device according to claim 5, wherein the friction plate is connected to the slide by a holding projection, the holding projection engaging in a corresponding recess on the slide, the recess being dimensioned relative to the holding projection in such a way that the friction plate is movable laterally including in a transverse direction relative to a direction of movement of the slide.

7. Displacement device according to claim 6, wherein the slide includes a plurality of recesses, into which the holding projection of the friction plate is insertable.

8. Displacement device according to claim 7, wherein the support has first and second square tubes, which are spaced apart and are interconnected by a fastening plate, and the displacement cylinder arrangement is located between the first and second square tubes.

9. Displacement device according to claim 8, wherein the support is configured as a one-piece casting being made of aluminum.

10. Displacement device according to claim 9, further comprising an end plate at each end of the support, to which the piston rod of the displacement cylinder arrangement is fastened.

11. Displacement device according to claim 10, further comprising a separate base disposed at a bottom of the displacement mechanism to ensure a structural height.

12. Displacement device according to claim 11, further comprising spacers insertable between the lifting cylinder and friction plate.

13. Displacement device according to claim 12, further comprising slide-material discs disposed between the support and the slide.

14. Displacement device according to claim 13, wherein a supply of hydraulic oil to the displacement cylinder arrangement is effected by the piston rod.

15. Displacement device according to claim 14, wherein an actuation of the displacement cylinder arrangement is respectively effected by a pump.

16. Displacement device according to claim 15, further comprising a non-driven displacement unit coupled to the slide by a linkage pivotably attached to the non-driven displacement unit and the slide, respectively, in order to ensure two-point lifting.

* * * * *

UNITED STATES PATENT AND TRADEMARK OFFICE
CERTIFICATE OF CORRECTION

PATENT NO. : 5,682,821
DATED : November 4, 1997
INVENTOR(S) : Heller, et al

It is certified that error appears in the above-indentified patent and that said Letters Patent is hereby corrected as shown below:

On the title page: Item

[75] Inventors: "Erlanger" should read --Erlangen--

[73] Assignee: insert -- & Co. KG-- after the letters "GmbH"

Col. 1, line 9: delete "BACKGROUND OF THE INVENTION"

Col. 1, line 15: insert --BACKGROUND OF THE INVENTION--

Col. 1, line 15: delete "SUMMARY OF THE INVENTION"

Col. 1, line 33: insert --SUMMARY OF THE INVENTION--

Col. 2, line 35: insert --, a two point displacement device-- after the word "respectively"

Col. 3, line 46: "device i" should read --device 1--

Signed and Sealed this

Twelfth Day of October, 1999

Attest:

Q. TODD DICKINSON

*Attesting Officer*  Acting Commissioner of Patents and Trademarks